United States Patent [19]

Okamoto

[11] Patent Number: 5,138,367
[45] Date of Patent: Aug. 11, 1992

[54] COLOR ADJUSTMENT DEVICE OF COLOR IMAGE FORMING APPARATUS

[75] Inventor: Tomoyuki Okamoto, Nagoya, Japan

[73] Assignee: Brother Kogyo Kabushiki Kaisha, Aichi, Japan

[21] Appl. No.: 767,113

[22] Filed: Sep. 27, 1991

[30] Foreign Application Priority Data

Oct. 2, 1990 [JP] Japan .................. 2-104432[U]

[51] Int. Cl.⁵ .................. G03B 27/32; G03B 27/52
[52] U.S. Cl. .................................. 355/32; 355/35
[58] Field of Search ............. 355/209, 35, 38, 32, 355/20, 37

[56] References Cited

U.S. PATENT DOCUMENTS

| | | | |
|---|---|---|---|
| 3,069,971 | 12/1962 | Simmon et al. | 355/38 |
| 4,319,834 | 3/1982 | Terrill | 355/35 |
| 4,707,120 | 11/1987 | Yamamoto | 355/38 |
| 4,963,925 | 10/1990 | Miyazaki | 355/35 X |
| 4,989,032 | 1/1991 | Hull et al. | 355/38 |
| 5,043,824 | 8/1991 | Suzuki | 355/35 X |
| 5,068,686 | 11/1991 | Taira | 355/32 |

Primary Examiner—Richard A. Wintercorn
Attorney, Agent, or Firm—Kane, Dalsimer, Sullivan Kurucz, Levy, Eisele and Richard

[57] ABSTRACT

A color adjustment device used for a copying machine has a chromaticity indication plate for indicating chromaticity with respect to four basic colors which can be recognized by a general user, four red, yellow, blue and green switches for selecting a chromaticity on the chromaticity indication plate, and a plurality of light emitting members for indicating a grade or level of chroma of each color. The user without expert knowledgement concerning color can adjust easily a color balance of an image outputted from the copying machine.

9 Claims, 6 Drawing Sheets

COLOR ADJUSTMENT DEVICE OF COLOR IMAGE FORMING APPARATUS

BACKGROUND OF THE INVENTION

This invention relates to a color adjustment device for adjusting a color balance or tone on an color image outputted from a color image forming apparatus such as a copying machine, a printer, etc..

A conventional color copying machine has an color adjusting device for adjusting precisely a color balance of an outputted image, which is disposed on an upper panel of the main body of the copying machine. Such a color adjusting device has an adjusting panel 10, as shown in FIG. 8, on the left side of which three switches 11Y, 11M and 11C colored with yellow, magenda and cyan are disposed and on the right side of which other three switches 11B, 11G and 11R colored with blue, green and red are disposed, respectively. The three switches 11Y, 11M and 11C are for selecting hue of yellow, magenda and cyan, respectively. The other three switches 11B, 11G and 11R are for selecting hue of blue, green and red, respectively. Between the left and right switches 11Y, 11M, 11C: 11B, 11G, 11R are disposed an indication means 12 for indicating chroma or hue of each color, which comprises three indication lines 13, 14 and 15, each having a plurality of light emitting diodes (LEDs). In FIG. 8, seven LEDs are respectively disposed between the yellow and blue switches 11Y and 11B, magenda and green switches 11M and 11G, and the cyan and red switches 11C and 11R. Yellow, magenda and cyan are three primary colors for printing and red, green and blue are intermediate colors obtained by mixing two of the three primary colors with each other. That is, red is an intermediate color of yellow and magenda, green is an intermediate color of yellow and cyan and blue is an intermediate color of magenda and cyan. The above six colors are designated as standard colors for adjusting color balance or hue.

A color adjustment is carried out in the following manner.

In a normal state of a color adjustment display, before the color adjustment by a user is performed, three LEDs 13', 14' and 15' in the respective center positions of the three display lines 13, 14 and 15 are turned on. This means that the color adjustment has not been performed yet. With this state, if the user feels that the color of a full-color image outputted from the copying machine is relatively tinged with red, the user pushes once the left cyan switch 11C opposite to the right red switch 11R to turn on an LED 15" located adjacently on the side of the cyan switch 11c, with respect to the intermediate LED15'. The user recognizes by turning on the LED15" that a color of the full-color image is adjusted to be deviated, by one grade or level, from normal to the cyan side thereby decreasing red component of the color. Namely, if the cyan switch 11C is pushed, the color of the full-color image is adjusted to be on the side of cyan to decrease the component of red which is opposite to cyan. In contrast, if the red switch 11R is pushed, the color of the full-color image is adjusted to be on the side of red to decrease cyan component. In the same manner as described above, a color adjustment is carried out between the yellow and blue switches 11Y and 11B and the magenda and green switches 11M and 11G, respectively.

Yellow, magenda and cyan are colors used in the field of printing and are conveniently used in mixture of toner of a copying machine and of pigment of a printing machine. However, in general, a user of a copying machine or the like does not have expert knowledges to understand correctly what colors magenda and cyan are. Especially, he does not understand the differences between magenda and red, and cyan and blue. There is actually a difference between a hue generally recognized from the word "blue" and that recognized from the word "blue" in the field of printing, and the user does not recognize their differences correctly. As mentioned above, the switches 11B, 11G, 11R, 11Y, 11M and 11C of the color adjustment panel 10 are colored with the respective colors, respectively, so as to be color-adjusted visually easily, and, however, even if the user sees the disposition of such colors, he does not know the relative relationship of each color. Therefore, the user cannot operate correctly each switches for the color adjustment thereby taking a long time for the color adjustment, and making it very difficult.

SUMMARY OF THE INVENTION

It is an object of the present invention to provide a color adjustment device of a color image forming apparatus which a general user without any expert knowledgement can operate easily and correctly.

According to the present invention, there is provided a color adjustment device for adjusting color balance or tone of an image outputted from a color image forming apparatus by adjusting a color filter, which comprises: a chromaticity indication surface for indicating chromaticity with respect to four basic colors of red, yellow, green and blue which are generally recognized; a switch means for selecting a chromaticity on said chromaticity indication surface; and an indication means for indicating a grade of chroma of each color in accordance with a switching operation of said switch means, said color filter being adjusted in response to signal from the indication means.

Further objects, features and other aspects of this invention will be understood from the following detailed description of the preferred embodiments of this invention with reference to the drawings.

DETAILED DESCRIPTION OF THE INVENTION

Figure 1:
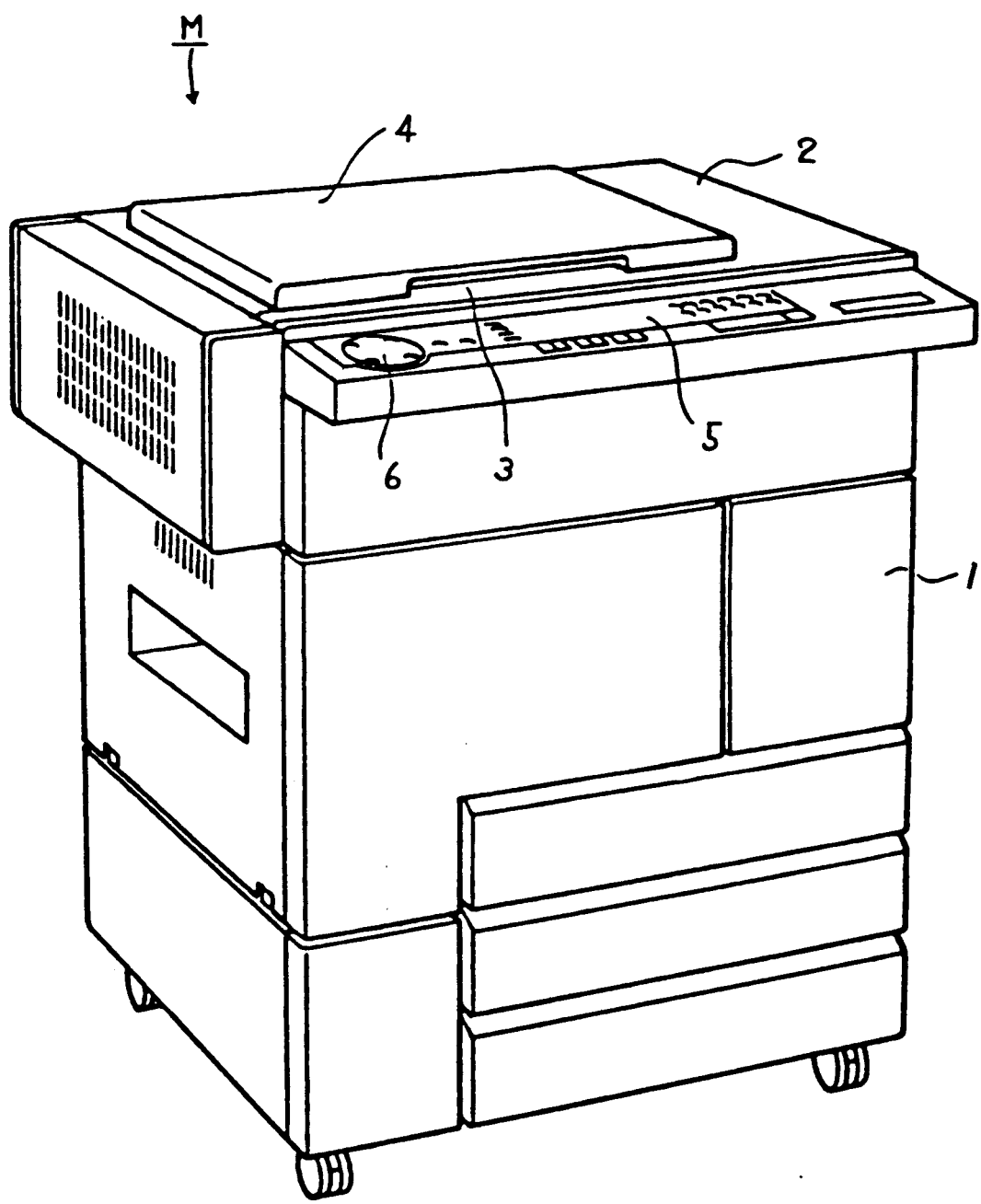
FIG. 1 is a perspective view showing a copying machine for which a color adjustment device of the present invention is adapted.

In FIG. 1, a copying machine M for copying a full-color image has a body 1 and an upper face 2 which is provided with an original table 3 for putting an original thereon. The original table 3 is covered with a cover 4 with the original thereunder. At the front position of the upper face 2 is provided an input device 5 for inputting various operational conditions for copying the original placed on the original table 3. At the left portion of the input device 5 is disposed a color adjustment device 6, according to this invention, for adjusting a color balance or tone of an image outputted from the copying machine M.

Figure 2:
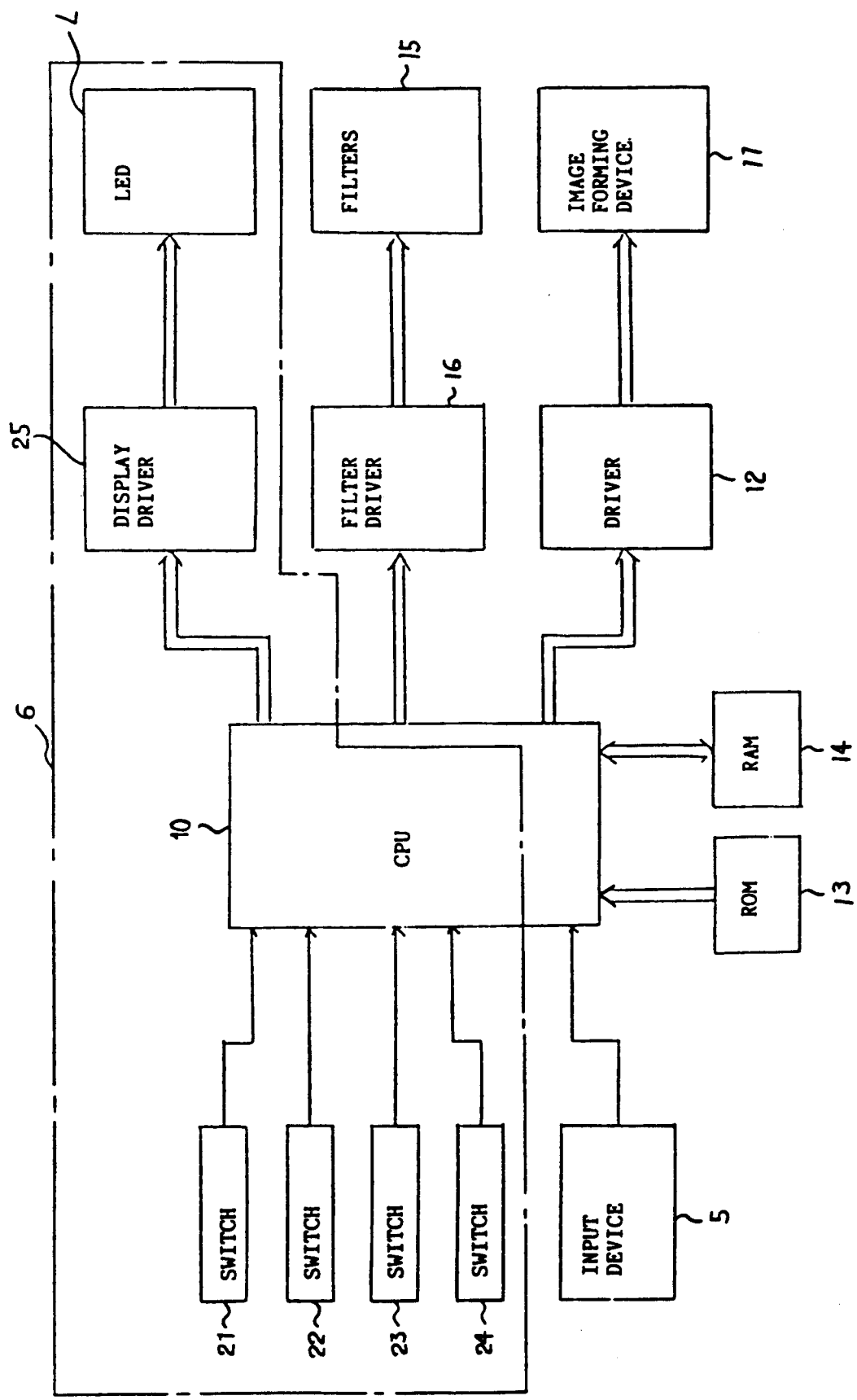
FIG. 2 is a block diagram showing a structure of an electric control system of the copying machine.
Figure 3:
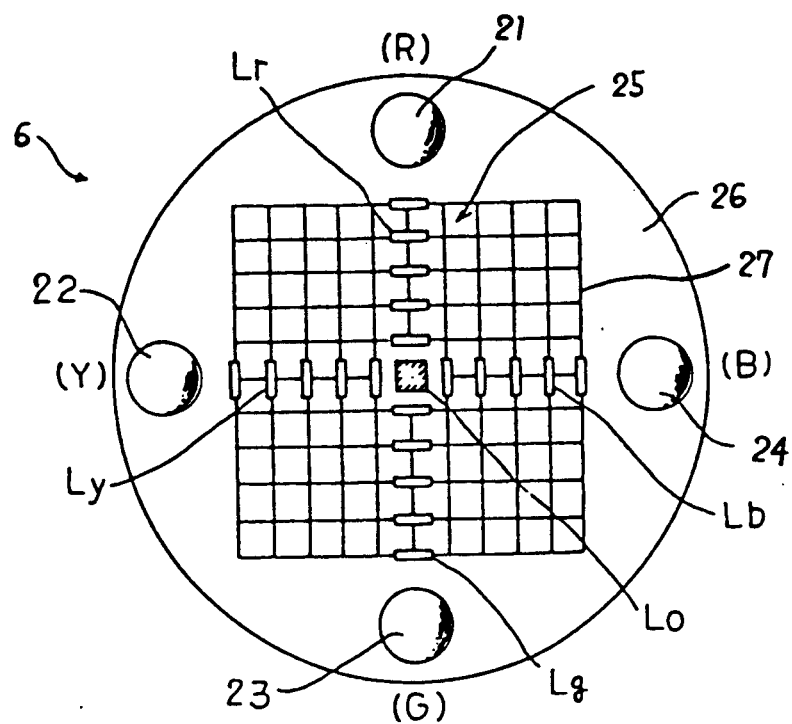
FIG. 3 is a plan view of the color adjustment device in a normal state.
Figure 4:
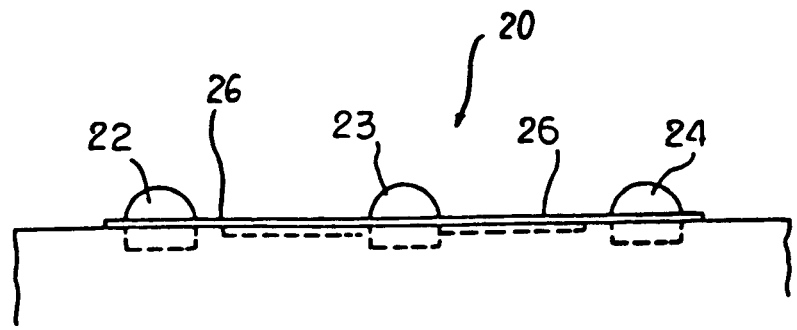
FIG. 4 is a side elevational view of the color adjustment device.
Figure 5:
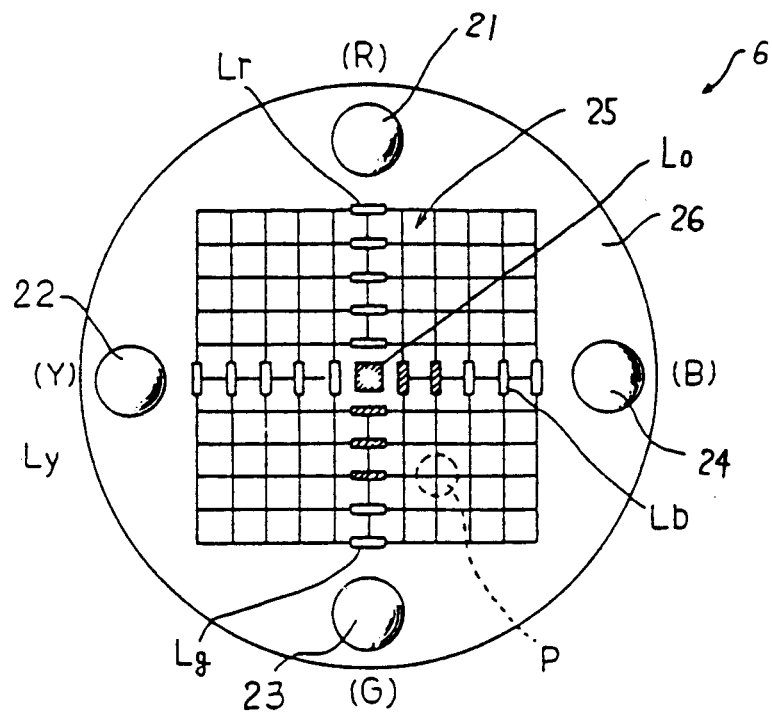
FIG. 5 is a plan view of the color adjustment device showing a color adjustment operation.
Figure 8:
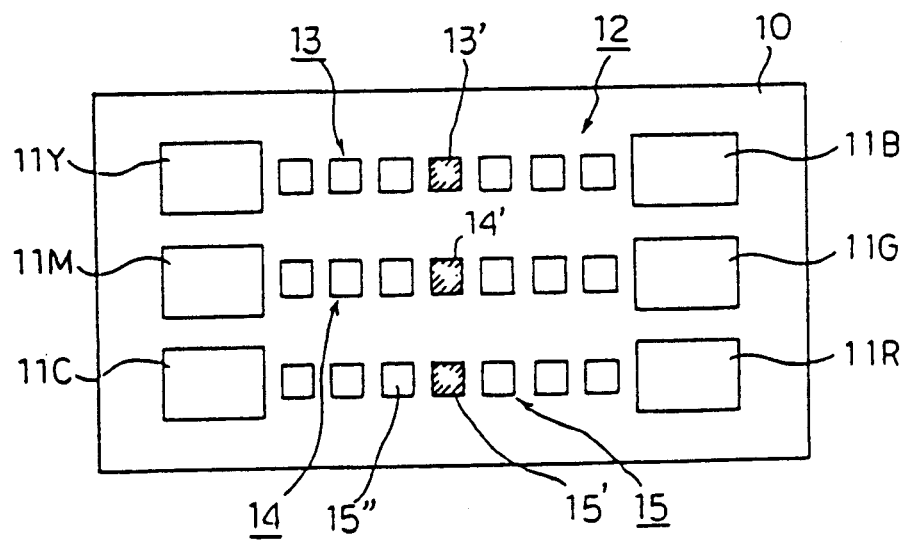
FIG. 8 is a plan view of a conventional color adjustment device.

The copying machine M has, as shown in FIG. 2, a common CPU 10 for controlling various operations during a copying operation. To CPU 10 is connected the input device 5, an image forming device 11 including an illumination device, exposure device, heat-fixing device, etc. for forming an image through a driver 12 for driving the image forming device 11, a plurality of color filters 15 for a color adjustment through a filter driver 16 for driving the color filters 15 in response to an adjust signal outputted from CPU 10, and the color adjustment device 6 according to this invention. The color adjustment device 6 has, as shown in FIGS. 3 and 4, a chromaticity indication surface 26 such as an indication circle plate for displaying chromaticity between red, yellow, green and blue which are four basic colors desigated generally in NCS indication system (Sweden Standard SS 009-00-03). On the indication surface 26 are disposed red, yellow, green and blue colors, in a circle, with an angular interval of 90° to form chromaticity coordinates 25. In FIG. 3, a position R indicates a red region, a position Y indicates a yellow region, a position G indicates a green region and a position B indicates a blue region. A region between each region of four basic colors forms a mixture region of an intermediate color in which each basic color is mixed with each other. The chromaticity coordinates 25 comprises a grid 27. The red region has a red switch 21, the yellow region has a yellow switch 22, the green region has a green switch 23 and the blue region has a blue switch 24 in order to select chroma of each color; and the chromaticity coordinates 25 indicates grade or level of chroma of each color. The coordinates 25 have a plurality of light emitting diodes Lr, Ly, Lg and Lb disposed along two coordinates axes and a light emitting diode Lo disposed at the center of the coordinates 25. There are five LEDs disposed at an equal interval between the center LED Lo and each of switches 21, 22, ... 24. Each LED indicates a grade of chroma of each color. When each switch is pushed once, an LED, adjacent to an LED being now lighting, on the side of the switch having been pushed is turned on. The grid 27 is a lattice which comprises a plurality of longitudinal lines passing a plurality of LEDs Ly and Lb as a plurality of grade indicating points of relative chroma between yellow and blue and a plurality of lateral lines passing a plurality of LEDs Lr and Lg as a plurality of grade indicating points of relative chroma between red and green. Each intersecting point of the two longitudinal and lateral lines indicates a chromaticity. The grid 27 is colored with a color different from a background color of the indication surface 26 to be recognized clearly by a user. The LEDs L(Lr, Ly, Lg, and Lb) and the grid 27 form a chromaticity grade indication means.

Referring back to FIG. 2, the four switches 21, 22, ... 24 are connected to the CPU 10 which turns on and off the LEDs L through a display driver 25 in accordance with a switching operation by each of switches 21, 22, ... 24.

When the switching operation is performed, the trichromatic resolution filters 15 disposed in a latent image forming device as disclosed in U.S. Pat. No. 4,875,073 is operated through the filter driver 16 to adjust color tone or balance of a latent image. The filter 15 and the filter driver 16 are disclosed in the above U.S. Patent in detail and, therefore, those structures are not explained herein.

The operation of the color adjustment device will now be explained with reference to FIGS. 3 to 6.

FIG. 3 shows a normal state of the color adjustment device in which a user does not adjust color tone or balance of an image outputted from the copying machine M, and only the center LED Lo is turned on. With this state, the color balance of the full-color image must be in good condition without deviating from the normal state toward anyone of red, yellow, green and blue colors. However, there may occur a case where the color balance deviates from the normal state when operational conditions for the copying machine M are changed and the user wishes to change the color balance according to his desire. For example, when the user compares an outputted full-color image with an original image, if he feels that the outputted full-color image is a little tinged with cinnabar or vermilion (an intermediate color between red and yellow), the user picks up a coordinates point corresponding to a region which is a little tinged with cinnabar and which has a high grade of chroma of red and yellow. Thereafter, the user pushes the green and blue switches 23 and 24 necessary times, respectively, to turn on the LEDs Lg and Lb corresponding to a coordinates point P in symmetry with the coordinates point on the cinnabar region with respect to the center of the coordinates. For example, if the green switch 23 is pushed three times and the blue switch 24 is pushed twice, three successive LEDs Lg from the center LED Lo toward the green switch 23 are turned on and two successive LEDs Lb are turned on. This operation increases green and blue components in the full-color image, and the user can make sure clearly that a hue at the point P as an intersecting point of the longitudinal and lateral lines corresponding to two LEDs having been turned on and disposed at the outermost positions of the coordinates 25 is added to the outputted full-color image.

In this manner, a cinnabar component of the outputted full-color image is decreased to adjust the full-color image so as to have a desired and beautiful color balance or tone. Likewise, other color adjustment is carried out and a hue or color balance adjusted in the above manner is indicated on the indication surface 26.

Figure 6:
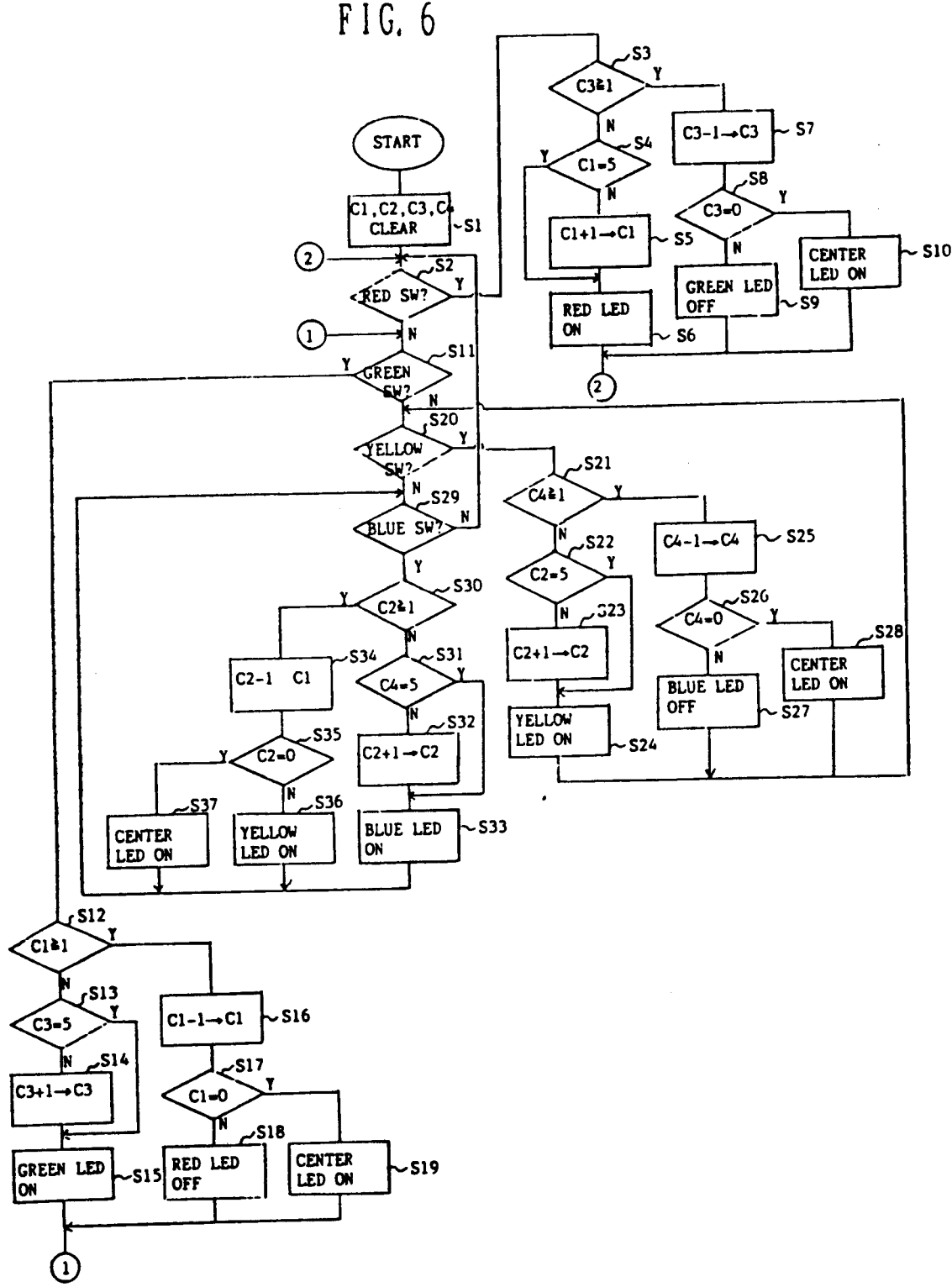
FIG. 6 is a flowchart showing the color adjustment operation.

The switching operation will now be explained in more detail with reference to a flow chart shown in FIG. 6.

First, a counter for counting the number of LEDs having been turned on is cleared or initialized in step S1. C1, C2, C3 and C4 show the numbers of LEDs Lr, Ly, Lg and Lb, having been turned on, respectively. Then, it is discriminated whether or not the red switch 21 is pushed in step S2. If YES in step S2, it is discriminated whether or not the number of green LEDs Lg having been turned on is equal to 1 or more in step S3, that is, any green LED is turned on. If NO in step S3, that is, C1 is 0 (no green LED is turned on), it is discriminated whether or not C1=5 in step S4. If YES in step S4, that is, the outermost LED Lr has been already turned on, the five red LEDs are kept on because of no more LED to be turned on in step S6. If NO in step S4, 1 is added to C1 to turn on one more red LED in addition to some LEDs having been already turned on in step S6. If YES in step S3, that is, at least one green LED has been already turned on, 1 is subtracted from C3 in step S7. In step S8, it is determined whether or not C3=0. If YES in step S8, that is, no green LED is turned on, the enter diode Lo is turned on in step S10. If No in step S8, one green diode Lg is turned off in step S9.

If NO in step S2, that is, the red switch 21 is not turned on, the flow goes to step S11 in which it is discriminated whether the green switch 23 is turned on. If YES in step S11, it is discriminated whether or not any red LED is turned on in step S12. If no red LED is turned on, one green LED is turned on in addition to some green LEDs having been already turned on (step S13 to S15). If at least one red LED has been already turned on in step S12, one red LED being now lighting and disposed at the outermost position in the coordinates 25 is turned off (step S16 to S18). If all red LEDs are turned off, the center LED Lo is turned on (steps S17 and S19).

Likewise, it is detected which switch is turned on in steps 20 and 29, and the same operations as described above are performed through steps 21 to 28 with respect to the yellow switch 22 and steps S29 to S37 with respect to the blue switch 24.

Figure 7:
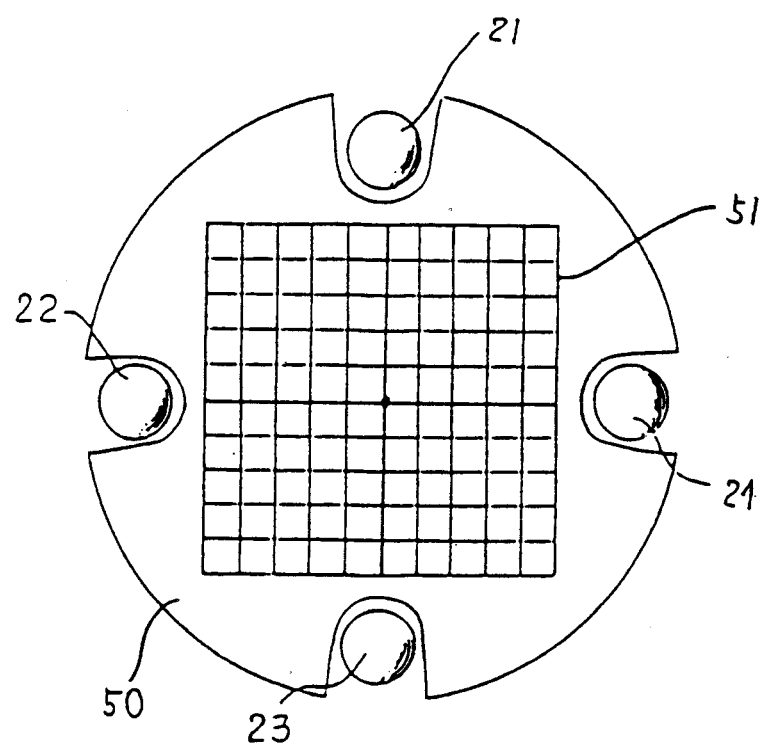
FIG. 7 is a plan view of another embodiment of the color adjustment device.

In the above embodiment, the chromaticity indication plate is used as the chromaticity indication surface 26. However, instead of the plate, a color LCD or CRT 50 may be used as shown in FIG. 7. In this case, coordinates 51 are provided in the LCD or CRT 50 and each coordinates point can be arbitrarily indicated.

In this invention, the chromaticity indication surface is colored with red, yellow, blue and green which are generally recognized by a user of the copying machine and are indicated on the basis of NCS color indication system. Therefore, a general user can understand the colors displayed on the indication surface 26. Further, since the four switches 21, 22, . . . 24 are disposed to change the grade or level of chroma of the four colors, and an indication means is disposed to indicate the grade of chroma of the four colors in response to the switching operation of the four switches 21, 22, . . . 24, the user can recognize easily a basic color or an intermediate color between each color, to be adjusted, by pushing one of the four switches or two adjacent switches while seeing the chromatic indication surface. This results in a reliable, simple and quick color adjustment. In addition, the user can recognize easily the state of color adjustment and the relative relationship between each basic color by simply glancing at the chromaticity indication surface 26.

What is claimed is:

1. A color adjustment device for adjusting color balance or tone of an image outputted from a color image forming apparatus by adjusting a color filter, which comprises:
    a) a chromaticity indication surface for indicating chromaticity with respect to four basic colors of red, yellow, green and blue which are generally recognized;
    b) a switch means for selecting a chromaticity on said chromaticity indication surface; and
    c) an indication means for indicating a grade of chroma of each color in accordance with a switching operation of said switch means,
said color filter being adjusted in response to a signal from the indication means.

2. A color adjustment device according to claim 1, wherein said four basic colors are disposed in a circle on said chromaticity indication surface to form four red, yellow, green and blue regions.

3. A color adjustment device according to claim 1, wherein said switch means comprises four red, yellow, green and blue switches disposed at an angular interval of 90°, in red, yellow, green and blue regions on said chromaticity indication surface.

4. A color adjustment device according to claim 1, wherein said indication means comprises a grid as coordinates formed between four switches disposed, at an angular interval of 90°, in red, yellow, green and blue regions on said chromaticity indication surface, respectively, and a plurality of light emitting members disposed in said coordinates.

5. A color adjustment device according to claim 4, wherein said light emitting members are disposed at an equal interval on two lines between a red and a green switches and between a yellow and a blue switches, respectively.

6. A color adjustment device according to claim 5, wherein an intermediate color is indicated by an intersecting point of a longitudinal line passing a light emitting member, having been turned on, disposed at the outermost coordinates position and a lateral line passing a light emitting member, having been turned on, disposed at the outermost coordinates position.

7. A color adjustment device according to claim 4, said light emitting members are light emitting diodes.

8. A color adjustment device according to claim 5, wherein said light emitting members are turned on or off when a corresponding switch is pushed.

9. A color adjustment device according to claim 1, wherein said chromaticity indication surface comprises a CRT or LCD.

* * * * *